(12) United States Patent
Hsiang et al.

(10) Patent No.: US 11,082,695 B2
(45) Date of Patent: Aug. 3, 2021

(54) METHOD AND APPARATUS OF BINARIZATION AND CONTEXT-ADAPTIVE CODING FOR SYNTAX IN VIDEO CODING

(71) Applicant: HFI Innovation Inc., Zhubei (TW)

(72) Inventors: Shih-Ta Hsiang, New Taipei (TW); Tzu-Der Chuang, Zhubei (TW)

(73) Assignee: HFI Innovation Inc., Zhubei (TW)

( * ) Notice: Subject to any disclaimer, the term of this patent is extended or adjusted under 35 U.S.C. 154(b) by 0 days.

(21) Appl. No.: 16/444,052

(22) Filed: Jun. 18, 2019

(65) Prior Publication Data
US 2019/0306508 A1     Oct. 3, 2019

Related U.S. Application Data

(62) Division of application No. 15/314,645, filed as application No. PCT/CN2015/081751 on Jun. 18, 2015, now Pat. No. 10,382,759.
(Continued)

(51) Int. Cl.
*H04N 19/13*     (2014.01)
*H04N 19/91*     (2014.01)
*H04N 19/70*     (2014.01)

(52) U.S. Cl.
CPC .............. *H04N 19/13* (2014.11); *H04N 19/70* (2014.11); *H04N 19/91* (2014.11)

(58) Field of Classification Search
USPC .................................................. 375/240.02
See application file for complete search history.

(56) References Cited

U.S. PATENT DOCUMENTS 10,291,940 B2    5/2019   Seregin et al.
2010/0310169 A1   12/2010   Liu et al.
(Continued)

FOREIGN PATENT DOCUMENTS

CN    103597834 A    2/2014
CN    103782597 A    5/2014
(Continued)

OTHER PUBLICATIONS

Hsiang, S.T., et al.; "AHG8 Coding the prediction differences of the intra BC vectors;" Joint Collaborative Team on Video Coding (JCT-VC) of ITU-T SG 16 WP 3 and ISO/IEC JTC 1/SC 29/WG 11; Mar.-Apr. 2014; pp. 1-4.
(Continued)

*Primary Examiner* — Christopher S Kelly
*Assistant Examiner* — Ana Picon-Feliciano
(74) *Attorney, Agent, or Firm* — Oblon, McClelland, Maier & Neustadt, L.L.P.

(57) ABSTRACT

A method performs entropy coding and decoding for source symbols generated in a video coding system. The method receives a palette index map for a current block, and determines a number of consecutive pixels having a same palette index as a current palette index in a scanning order through the current block. The method then converts the number of the consecutive pixels minus one to a bin string using a binarization method, and encodes the bin string using context-adaptive binary arithmetic coding (CABAC) by applying a regular CABAC mode to at least one bin of the bin string according to a context adaptively selected depending on the current palette index.

10 Claims, 3 Drawing Sheets

Related U.S. Application Data (60) Provisional application No. 62/021,287, filed on Jul. 7, 2014, provisional application No. 62/020,518, filed on Jul. 3, 2014, provisional application No. 62/017,401, filed on Jun. 26, 2014, provisional application No. 62/014,970, filed on Jun. 20, 2014.

(56) References Cited

U.S. PATENT DOCUMENTS

| | | |
|---|---|---|
| 2013/0336386 A1 | 12/2013 | Chong et al. |
| 2014/0192861 A1 | 7/2014 | Chuang et al. |
| 2014/0301475 A1* | 10/2014 | Guo .................. H04N 19/50 375/240.24 |
| 2015/0264363 A1* | 9/2015 | Pu .................... H04N 19/93 375/240.02 |
| 2015/0341655 A1 | 11/2015 | Joshi et al. |
| 2016/0156939 A1 | 6/2016 | Seregin et al. |
| 2016/0277760 A1* | 9/2016 | Li .................... H04N 19/126 |

FOREIGN PATENT DOCUMENTS

| | | |
|---|---|---|
| JP | 2017-520157 A | 7/2017 |
| WO | 2012/134246 A2 | 10/2012 |
| WO | 2012/176450 A1 | 12/2012 |
| WO | 2013/107230 A1 | 7/2013 |
| WO | 2015179829 A | 11/2015 |
| WO | 2016/049440 A1 | 3/2016 |

OTHER PUBLICATIONS

Hsiang, S.T., et al.; "Modified Method for Coding MVD in the CABAC mode," Joint Collaborative Team on Video coding (JCT-VC) of ITU-T SG 16 WP 3 and ISO/IEC JTC 1/SC 29/WG 11; Nov. 2011; pp. 1-4.

Hsiang, S.T., et al.; "Non-CE11 Modified method for coding the positions of last signifcant coefficients in the CABAC mode:" Joint Collaborative Team on Video Coding (JCT-VC) of ITU-T SG 16 WP 3 and ISO/IEC JTC 1/SC 29/WG 11; Nov. 2011; pp. 1-4.

Hsiang, S.T., et al.; "CE6: Results of Test B.4 on palette index coding;" Joint Collaborative Team on Video Coding (JCT-VC) of ITU-T SG 16 WP 3 and ISO/IEC JTC 1/SC 29/WG 11; Oct. 2014; pp. 1-4.

Hsiang, S.T., et al.; "Run Coding mode of the palette index map using a universal entropy coding scheme;" Joint collaborative Team on Video Coding (JCT-VC) of ITU-T SG 16 WP 3 and ISO/IEC JTC 1/SC 29/WG 11; Jun.-Jul. 2014; pp. 1-7.

Hsiang, S.T., et al.; "Non-SCCE4: Unified method for coding string matching using a universal entropy coding scheme;" Joint Collaborative Team on Video Coding (JCT-VC) of ITU-T SG 16 WP 3 and ISO/IEC JTC 1/SC 29/WG 11; Jun.-Jul. 2014; pp. 1-7.

Hsiang, S.T., et al.; "CE6-related: Harmonization of CE6 TEST A4, A5, and A6;" Joint Collaborative Team on Video coding (JCT-VC) of ITU-T SG 16 WP 3 and ISO/IEC JTC 1/SC 29/WG 11; Oct. 2014; pp. 1-8.

S-T Hsiang et al(Hsiang, S.T., et al.; "Modified Method for Coding MVD in the CABAC mode;" Joint Collaborative Team on Video Coding (JCT-VC) of ITU-T SG 16 WP 3 and ISO/IEC JTC 1/SC 29/WG 11; Nov. 2011; pp. 1-4) (Year: 2011).

Guo, L., et al (Guo, L., et al.; "Non-RCE3: Modified Palette Mode for Screen Content Coding;" Joint Collaborative Team on Video Coding (JCT-VC) of ITU-T SG 16 WP 3 and ISO/IEC JTC 1/SC 29/WG 11; Jul.-Aug. 2013; pp. 1-6) (Year: 2013).

International Search Report dated Oct. 9, 2015, issued in application No. PCT/CN2015/081751.

Guo, L., et al.; "Non-RCE3: Modified Palette Mode for Screen Content Coding;" Joint Collaborative Team on Video Coding (JCT-VC) of ITU-T SG 16 WP 3 and ISO/IEC JTC 1/SC 29/WG 11; Jul.-Aug. 2013; pp. 1-6.

Hsiang et ai.(Hsiang, S.T., et al.; "Non-CE11 Modified method for coding the positions of last signifcant coefficients in the CABAC mode;" Joint Collaborative Team on Video Coding (JCT-VC) of ITU-T SG 16 WP 3 and ISO/I EC JTC 1/SC 29/WG 11; Nov. 2011; pp. 1-4). (Year: 2011).

Guo, et al.: "Evaluation of Palette Mode Coding on HM-12.0+RExt-4.1"; Joint Collaborative Team on Video Coding (JCT-VC) of ITU-T SG 16 WP 3 and ISO/IEC JTC 1/SC 29/WG 11; 15th Meeting: Geneva, CH, Oct. 23-Nov. 1, 2013; pp. 1-6.

Joshi, R., et al.; "Non-SCCE3: Contexts for coding index runs;" Joint Collaborative Team on Video Coding (JCT-VC) of ITU-T SG 16 WP 3 and ISO/IEC JTC 1/SC 29/WG 11; Jun.-Jul. 2014; pp. 1-3. JCTVC-P0198WD; Jan. 2014; pp. 1-10.

\* cited by examiner

METHOD AND APPARATUS OF BINARIZATION AND CONTEXT-ADAPTIVE CODING FOR SYNTAX IN VIDEO CODING

CROSS REFERENCE TO RELATED APPLICATIONS

The present invention is a Divisional of U.S. Ser. No. 15/314,645, field on Nov. 29, 2016, which is a 371 Application of PCT Serial No. PCT/CN2015/081751, filed on Jun. 18, 2015, which claims priority to U.S. Provisional Patent Application, Ser. No. 62/014,970, filed on Jun. 20, 2014, U.S. Provisional Patent Application, Ser. No. 62/017,401, filed on Jun. 26, 2014, U.S. Provisional Patent Application, Ser. No. 62/020,518, filed on Jul. 3, 2014 and U.S. Provisional Patent Application, Ser. No. 62/021,287, filed on Jul. 7, 2014. The Applications are hereby incorporated by reference in their entireties.

FIELD OF INVENTION

The present invention relates to entropy coding for syntax related to video coding. In particular, the present invention relates to techniques to binarization and context-adaptive coding of syntax related to video coding.

BACKGROUND OF THE INVENTION

High Efficiency Video Coding (HEVC) is a new coding standard that has been developed in recent years. In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU), which is also referred as coded tree unit (CTU) in HEVC. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition.

Figure 1:
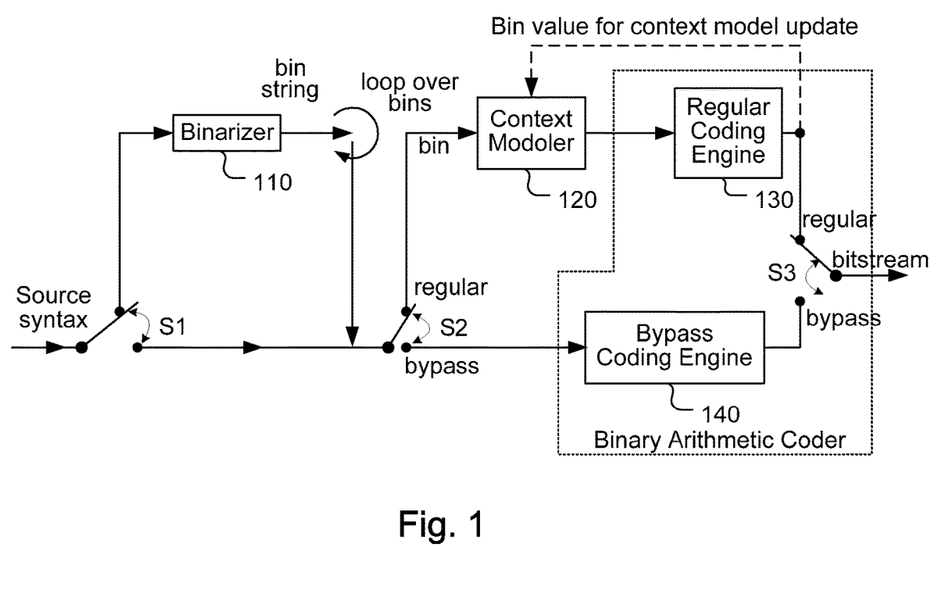
FIG. 1 illustrates an exemplary block diagram for CABAC (context-adaptive binary arithmetic coding), where a source syntax can be adaptively coded using a regular CABAC mode or a bypass mode.

Context-based adaptive binary arithmetic coding (CABAC) is a high efficiency entropy coding tool that has been widely used in advanced video coding such as H.264 and HEVC. For example, various syntax elements of the HEVC standard are coded in the CABAC mode, where entropy coding is applied to the binarized syntax elements adaptively based on context associated with an underlying syntax element. FIG. 1 illustrates an exemplary block diagram of the CABAC process. Since the arithmetic coder in the CABAC engine can only encode the binary symbol values, the CABAC process needs to convert the values of the syntax elements into a binary string using a binarizer (110). The conversion process is commonly referred to as binarization. During the coding process, the probability models are gradually built up from the coded symbols for the different contexts. The context modeler (120) serves the modelling purpose. During normal context based coding, the regular coding engine (130) is used, which corresponds to a binary arithmetic coder. The selection of the modeling context for coding the next binary symbol can be determined by the coded information. Symbols can also be encoded without the context modeling stage and assume an equal probability distribution, commonly referred to as the bypass mode, for reduced complexity. For the bypassed symbols, a bypass coding engine (140) may be used. As shown in FIG. 1, switches (S1, S2 and S3) are used to direct the data flow between the regular CABAC mode and the bypass mode. When the regular CABAC mode is selected, the switches are flipped to the upper contacts. When the bypass mode is selected, the switches are flipped to the lower contacts. as shown in FIG. 1.

The JCT standardization body is currently in the process of developing the HEVC screen content coding (SCC) extension. In contrast to the conventional natural video with a continuous color tone, the screen content video often contain a few pilot colors and sharp edges and boundaries. Several new tools are currently under investigation for potential adoption into the future of the HEVC SCC extension.

During the early development of HEVC range extensions (RExt), several proposals have been disclosed to address palette-based coding. For example, a palette prediction and sharing technique is disclosed in JCTVC-N0247 (Guo et al., "*RCE3: Results of Test 3.1 on Palette Mode for Screen Content Coding*", Joint Collaborative Team on Video Coding (JCT-VC) of ITU-T SG 16 WP 3 and ISO/IEC JTC 1/SC 29/WG 11, 14th Meeting: Vienna, AT, 25 July-2 Aug. 2013 Document: JCTVC-N0247) and JCTVC-O0218 (Guo et al., "*Evaluation of Palette Mode Coding on HM-12.0+RExt-4.1*", Joint Collaborative Team on Video Coding (JCT-VC) of ITU-T SG 16 WP 3 and ISO/IEC JTC 1/SC 29/WG 11, 15th Meeting: Geneva, CH, 23 Oct.-1 Nov. 2013, Document: JCTVC-O0218). In JCTVC-N0247 and JCTVC-O0218, the palette of each color component is constructed and transmitted. The palette can be predicted (or shared) from its left neighboring CU to reduce the bitrate. All pixels within the given block are then coded using their palette indices. An example of encoding process according to JCTVC-N0247 is shown as follows.

1. Transmission of the palette: the color index table size is first transmitted followed by the palette elements.
2. Transmission of pixel values: the pixels in the CU are encoded in a raster scan order. For each group of one or more pixels, a flag for a run-based mode is first transmitted to indicate whether the "Index" mode or "Copy-Above" mode is being used.

2.1 Index_Mode: In the Index_Mode, a palette index is first signaled followed by "palette_run" (e.g., M) representing the run value. The run value indicates that a total of M samples are all coded using Index_Mode. No further information needs to be transmitted for the current position and the following M positions since they have the same palette index as that signaled in the bitstream. The palette index (e.g., i) may also be shared by all three color components, which means that the reconstructed pixel values are (Y, U, V)=(palette$_Y$[i], palette$_U$[i], palette$_V$[i]) for the case of YUV color space.

2.2 Copy_Above_Mode: In the Copy_Above_Mode, a value "copy_run" (e.g., N) is transmitted to indicate that for the following N positions (including the current one), the palette index is the same as the corresponding palette index in the row above.

3. Transmission of residue: the palette indices transmitted in Stage 2 are converted back to pixel values and used as the prediction. Residue information is transmitted using HEVC residual coding and is added to the prediction for the reconstruction.

It is desirable to develop methods for further improving the coding efficiency associated with the syntax elements generated for palette mode coded blocks in screen content coding as well as in general video coding.

SUMMARY OF THE INVENTION

A method and apparatus for entropy coding and decoding for source symbols generated in a video coding system are disclosed. According to the present invention, a MSB (most significant bit) index and any refinement bit for the current symbol value are determined first. A first binary string is generated by binarizing a prefix part related to the MSB index of the current symbol value using a unary code or a truncated unary code. Also, a second binary string is generated by binarizing a suffix part corresponding to one or more refinement bits of the current symbol value using a fixed-length code or a truncated binary code if any refinement bit exists. The first binary string is coded using CABAC (context-adaptive binary arithmetic coding) and the second binary string is also coded using the CABAC if the second binary string exists.

The prefix part may correspond to the MSB index plus 1. Furthermore, the prefix part can be equal to (floor (log 2(x)+1) if x is greater than zero, and the prefix part is equal to 0 if x is equal to 0, where x representing the current symbol value, floor(y) is a floor function outputting a largest integer smaller than or equal to y and log 2( ) is a log-base-2 function. The bin of the first binary string can be coded in a regular CABAC mode if the bin has a bin index smaller than or equal to a threshold value T, and in a bypass mode if the bin has the bin index greater than the threshold value T.

In one embodiment, the current source symbol indicates the runlength minus one of a consecutive repeating palette index in a palette mode coded block for SCC (screen content coding). The first binary string is derived by binarizing the prefix part using the truncated unary code with a maximum value equal to (floor (log 2((MaxPaletteRun))+1), wherein MaxPaletteRun is equal to the number of remaining yet-to-be-coded pixels in the current coding unit (CU) minus one. The second binary string is derived by binarizing the suffix part using the truncated binary code with a maximum value equal to (MaxPaletteRun−(1<<(palette_run_msb_id_plus1−1))), wherein MaxPaletteRun is equal to the number of remaining yet-to-be-coded pixels in the current CU minus one and palette_run_msb_id_plus1 denotes the value of the prefix part.

The CABAC can be conditioned on the run type of the consecutive repeating palette index and the regular CABAC mode is applied to one or more bins of the first binary string or the second binary string. For example, the current source symbol may correspond to syntax Copy_Above_Mode representing a first runlength minus one of a consecutive first index in an above row, or syntax Index_Mode representing a second runlength minus one of a consecutive second index in a same row. A bin of the first binary string with a bin index equal to 0 is coded in a regular CABAC mode with three contexts. Furthermore, a first context can be selected if the palette index is less than a first threshold T1, a second context can be selected if the palette index is greater than or equal to the first threshold T1 and less than a second threshold T2, and a third context can be selected if the palette index is greater than or equal to the second threshold T2, and wherein the second threshold T2 is greater than the first threshold T1. For example, the first threshold T1 can be equal to 2 and the second threshold T2 can be equal to 4 or 8.

The current source symbol may also correspond to an absolution value of a first component or a second component of a two-dimensional signed or unsigned source vector. Furthermore, the prefix part is encoded before the suffix part and any sign bit.

In another embodiment of the present invention, the number of consecutive pixels having a same palette index as the current palette index in a scanning order through the current block is determined for the index mode. The number of the consecutive pixels minus one is converted to a bin string using a binarization method. The bin string is encoded using context-adaptive binary arithmetic coding (CABAC) by applying a regular CABAC mode to at least one bin of the bin string according to a context adaptively selected depending on the current palette index. The corresponding decoding process is also disclosed. For example, the decoder may receive an input coded bitstream including compressed data of a current block for a current source symbol corresponding to an index mode. A current palette index associated with a current run mode can be determined. A bin string is then decoded using context-adaptive binary arithmetic coding (CABAC) by applying a regular CABAC mode to at least one bin of the bin string according to a context adaptively selected depending on the current palette index. The bin string is converted into a runlength value related to a number of consecutive pixels having a same palette index as the current palette index using a binarization method. The runlength value corresponds to the number of consecutive pixels minus one. For the decoder side, the current palette index may correspond to a parsed palette index from the input coded bitstream or a reconstructed palette index.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention discloses a universal entropy coding method for source symbols generated in source data compression systems such as video coding. The method represents unsigned value associated with a source symbol in a binary form consisting of two parts: the most significant bits (MSB) part and the refinement bits part of its value. An index is assigned to each member in the MSB part. The resulting codeword is a concatenation of a prefix part and a suffix part. The prefix part is related to the MSB index of a symbol value. In one embodiment, the MSB part can be determined according to floor(log 2(x)), where x corresponds to the unsigned value associated with the source symbol and floor(y) is a floor function outputting a largest integer smaller than or equal to y and log 2(x) is a log-base-2 function. In this example, the corresponding MSB part would be meaningless for x=0. Accordingly, a term representing the MSB part plus one, denoted by msb_id_plus1, is introduced. The MSB plus one, msb_id_plus1 of an unsigned symbol x can be derived according to:

$$\text{msb\_id\_plus1} = \begin{cases} \text{floor}(\log 2(x)) + 1, & \text{if } x > 0; \\ 0, & \text{otherwise.} \end{cases} \quad (1)$$

The prefix part can be coded using a variable length code such as a unary code or a truncated unary code, if the maximum syntax value is known. For a given symbol value, the suffix part may or may not exist. The suffix part represents the refinement bits and the suffix part is present if msb_id_plus1>1. The value of refinement bits, denoted by refinement_bits, can be binarized using a fixed-length binary code or a truncated binary code. For example, the value of refinement bits can be represented by a string with string length equal to (msb_id_plus1−1) or a truncated binary code if the maximum syntax value is known. The decoded syntax value x can be derived based on the decoded prefix part (i.e., (msb_id_plus1−1)) and the decoded suffix part (i.e., refinement_bits) according to:

$$x = \begin{cases} (1 << (\text{msb\_id\_plus1} - 1)) + \text{refinement\_bits} & \text{if msb\_id\_plus1} > 1; \\ 0, & \text{otherwise.} \end{cases} \quad (2)$$

Table 1 illustrates an example of the codeword bin strings (also termed as binary strings) corresponding to symbol values 0-31 according to the binarization process incorporating an embodiment of the present invention. The msb_id_plus1 values are derived according to equation (1). The length of refinement bits is determined according to (msb_id_plus1−1). The binarization process according to the present invention may also be applied to signed source symbols by applying the above binarization process to the absolute value of the signed symbol value plus sign information. Furthermore, the binarization process can be applied to multi-dimensional source data such as vectors by using the binarization process to each vector component.

TABLE 1

| x | x in binary | msb_id_plus1 | refinement bins |
|---|---|---|---|
| 0 | 0 | 0 | — |
| 1 | 1 | 10 | — |
| 2 | 10 | 110 | 0 |
| 3 | 11 | 110 | 1 |
| 4 | 100 | 1110 | 00 |
| 5 | 101 | 1110 | 01 |
| 6 | 110 | 1110 | 10 |
| 7 | 111 | 1110 | 11 |
| 8-15 | 1000-1111 | 11110 | 000-111 |
| 16-31 | 10000-11111 | 111110 | 0000-1111 |

The resulting bin string for msb_id_plus1 can be coded by context adaptive binary arithmetic coding (CABAC) according to the present invention. The prefix part can be coded in CABAC with a more sophisticated context modeling scheme. The refinements and sign bits can be coded with a simpler context modeling scheme or in the bypass mode according to the present invention. In one embodiment, the prefix bin string is coded in the CABAC mode for the bins with bin index values smaller than or equal to a threshold value T, and in the bypass mode otherwise. In one embodiment, context selection is according to the bin index. Also, some bins with adjacent index values can share the same contexts. In another embodiment, T can be selected adaptively depending on the bitstream parser throughput constraint and coding efficiency requirement. Since a lower threshold, T will cause more symbols to be coded in the bypass mode, which will increase the bitstream parser throughput at the expense of reduced coding efficiency. The threshold, T can also be adjusted according to the consumption of the coded CABAC bins in the current coding unit (CU). For example, if less CABAC coded bins in the current coding unit is desirable, a smaller threshold, T can be used. In some embodiment, T is selected adaptively according to the CU size. For example, if palette coding is applied to the CU, a larger CU size will result in longer runlengths for the run modes. In this case, a larger threshold may be used to favor better coding efficiency.

The present invention is developed as a universal coding tool, useful for entropy coding of different syntax types corresponding to diverse coding statistics. It is particularly beneficial for screen content coding with mixed video content types and numerous new syntax types resulting from new coding tools, including Intra block copying (IntraBC), palette coding, and Intra string copying. Table 2 illustrates an exemplary syntax table for coding/decoding an unsigned source symbol using the context based coding incorporating an embodiment of the present invention. Different context modeling schemes can be employed for different syntax types specified by the input parameter syntaxType. As shown in Table 2, the prefix part represented by syntax msb_id_plus1 is signaled first. If the value of msb_id_plus1 is larger than 1, syntax refinement bits is signal. In other words, the suffix part will not be signaled if msb_id_plus1 has a value of 0 or 1.

TABLE 2

| unsigned_val_msb_index_coding( syntaxType) { | Descriptor |
|---|---|
| msb_id_plus1 | ae(v) |
| if(msb_id_plus1 > 1 ) | |
| refinement_bits | ae(v) |
| } | |

The context-based coding for MSB index disclosed above can be applied to various syntax elements generated during the coding process. For example, in screen content coding (SCC) as specified in the HEVC RExt, the color indices in a block may be coded using the "Run" mode. When the "Run" mode is selected, the number of the consecutive repeating pixels minus 1 for the current palette run mode is signalled. As mentioned before, there are two "Run" modes as indicated by Index_Mode and Copy_Above_Mode. In one embodiment, truncated signaling for coding both the prefix part and suffix part with the maximum run value, MaxPaletteRun, where MaxPaletteRun equals to the number of the remaining yet-to-be-coded pixels in the current coding unit (CU) minus 1. The resulting prefix syntax palette_run_msb_id_plus1 is coded using a truncated unary code with cMax=floor (log 2((MaxPaletteRun))+1, where function floor(x) outputs the largest integer smaller than or equal to x. The suffix syntax palette_run_refinement_bits is coded using a truncated binary code with cMax=MaxPaletteRun−(1<<(palette_run_msb_id_plus1−1)). Furthermore, the prefix palette_run_msb_id_plus1 can be coded using context-based coding, where the contexts are formed based on the bin index. Two separate context sets can be employed for palette_run_type_flag equal to Copy_Above_Mode and Index_Mode, respectively.

The bypass mode can be used for coding the bins with index values greater than a threshold Tr. For example, Tr can be equal to 4 or 6. Since the palette run length minus 1 is often equal to 0 when palette_run_type_flag is equal to Index_Mode and the current palette index is large, context modeling for bin index 0 can be further conditioned on the current palette index, paletteIndex, for the Index_Mode run type. In one embodiment, a first context is selected (i.e., context index=0) for (paletteIndex <T1), a second context is selected (i.e., context index=1) for (T1<=paletteIndex <T2), and the third context is selected (i.e., context index=1) for (T2<=paletteIndex). Threshold T2 is larger than threshold T1. The values for T1 and T2 can be selected properly. For example, T1 can be equal to 2 and T2 can be equal to 4 or 8.

Table 3 illustrates an exemplary mapping table of context selection for context-based coding of prefix palette_run_msb_id_plus1. The context selection can be conditioned on the parsed palette index, which corresponds to the coded modified palette index with redundancy removal. The context selection may also be conditioned on the reconstructed palette index, which corresponds to the actual palette index employed by the palette table. In one embodiment, when palette_run_type_flag is equal to Copy_Index_Mode and the parsed palette index value is greater than a threshold Ts, the palette run coding can be skipped. In this case, the palette run length minus 1 is inferred to be 0. In one embodiment, Ts is derived from the number of the palette colors in the current CU. The threshold values Tr, T1, T2, or Ts can be signaled in SPS (sequence parameter set), PPS (picture parameter set), slice header and/or in the Palette mode coded CU.

TABLE 3

| binIdx | 0 | 1 | 2 | 3 | 4 | >4 |
|---|---|---|---|---|---|---|
| palette_run_type_flag = Copy_Above_Mode | 5 | 6 | 6 | 7 | 7 | bypass |
| palette_run_type_flag = Copy_Index_Mode | 0, 1 | 2 | 3 | 3 | 4 | 4 | bypass |

In another example of context-based coding for MSB index associated with a syntax element, the resulting prefix syntax palette_index_msb_id_plus1 is coded using a truncated unary code with cMax=floor (log 2((MaxPaletteIdx))+1 and the suffix syntax palette_index_refinement_bits is coded by truncated binary code with cMax= MaxPaletteIdx−(1<<(palette_index_msb_idplus1−1)). The context modeling for entropy coding prefix palette_index_msb_id_plus1 can be conditioned on the bin index. The context modeling for entropy coding prefix palette_index_msb_id_plus1 can be further conditioned on MaxPaletteIdx. MaxPaletteIdx represents the maximum parsed palette index that corresponds to the maximum modified palette index with redundancy removal. In another embodiment, MaxPaletteIdx represents the maximum reconstructed palette index that corresponds to the maximum actual palette index employed by the palette table. Table 4 illustrates an exemplary mapping table of context selection for context-based coding of prefix palette_index_msb_id_plus1, where different context sets may be employed for CUs with different value of cMax=floor (log 2((MaxPaletteIdx))+1.

TABLE 4

| max msb_idx_p1 of the max CU palette index | 1 | 2 | 3 | | 4 | | | 5 | | | |
|---|---|---|---|---|---|---|---|---|---|---|---|
| bin index | 0 | 0 | 1 | 0 | 1 | 2 | 0 | 1 | 2 | 3 | 0 | 1 | 2 | 3 | 4 |
| context index | 0 | 0 | 1 | 0 | 1 | 2 | 0 | 1 | 2 | 3 | 0 | 1 | 2 | 3 | 4 |

The context-based coding disclosed above can also be applied to other syntax elements associated with the reference string employed in the Intra string copy (IntraBC) tool for screen content coding (SCC) associated with HEVC RExt. For example, context-based coding according to the present invention can be applied to the MSB indices for representing the length minus 1, offset minus 1, and offset vector of syntax elements dictionary_pred_length_minus1, dictionay_pred_offset_minus1, and (dictionay_pred_offsetX, dictionay_pred_offsetY), respectively. For coding the length, truncated signaling can be employed for coding the prefix and suffix with the maximum run value equal to the number of the remaining yet-to-be-coded pixels minus 1. For coding the offset vectors, the context-based coding according to the present invention can be applied to the absolute value of each vector component. Tables 5-7 illustrate exemplary mapping tables for context selection for the length minus 1, offset minus 1, and offset vector (x, y) of syntax elements mentioned above respectively.

TABLE 5

| bin index | 0 | 1 | 2 | 3 | 4 | 5 | 6 | 7 | 8 | 9 | >9 |
|---|---|---|---|---|---|---|---|---|---|---|---|
| context index | 0 | 1 | 2 | 3 | 3 | 4 | 4 | 5 | 5 | 6 | bypass |

TABLE 6

| bin index | 0 | 1 | 2 | 3 | 4 | 5 | 6 | 7 | 8 |
|---|---|---|---|---|---|---|---|---|---|
| context index | 0 | 1 | 1 | 2 | 2 | 3 | 3 | 4 | 4 |
| bin index | 9 | 10 | 11 | 12 | 13 | 14 | 15 | >15 | |
| context index | 5 | 5 | 6 | 6 | 7 | 7 | 8 | bypass | |

TABLE 7

| bin index | 0 | 1 | 2 | 3 | 4 | 5 | 6 | >6 |
|---|---|---|---|---|---|---|---|---|
| context index for x | 0 | 1 | 1 | 2 | 3 | 4 | 4 | bypass |
| context index for y | 5 | 6 | 6 | 7 | 8 | 9 | 9 | bypass |

For the index mode, the current palette index and the runlength are signaled. The palette index usually is signaled before the associated runlength. In another embodiment of the present invention, the associated runlength is context-adaptive coded based on the palette index. For example, the number of consecutive pixels having a same palette index as the current palette index in a scanning order through the current block is determined for the index mode. The number of the consecutive pixels minus one is converted to a bin string using a binarization method. The bin string is encoded using context-adaptive binary arithmetic coding (CABAC) by applying a regular CABAC mode to at least one bin of the bin string according to a context adaptively selected depending on the same palette index. A corresponding decoding process will perform the reverse steps of these performed by the encoder. For example, the decoder may receive an input coded bitstream including compressed data of a current block for a current source symbol corresponding to an index mode. A current palette index associated with a current run mode can be determined. A bin string is then decoded using context-adaptive binary arithmetic coding (CABAC) by applying a regular CABAC mode to at least one bin of the bin string according to a context adaptively selected depending on the current palette index. The bin string is converted into a runlength value related to a number of consecutive pixels having a same palette index as the current palette index using a binarization method. The runlength value corresponds to the number of consecutive pixels minus one. The coded consecutive pixels can be reconstructed using the current palette index in a scanning order through the current block. At the decoder side, the current palette index can be based on parsed palette index from the input coded bitstream or a reconstructed palette index.

Figure 2:
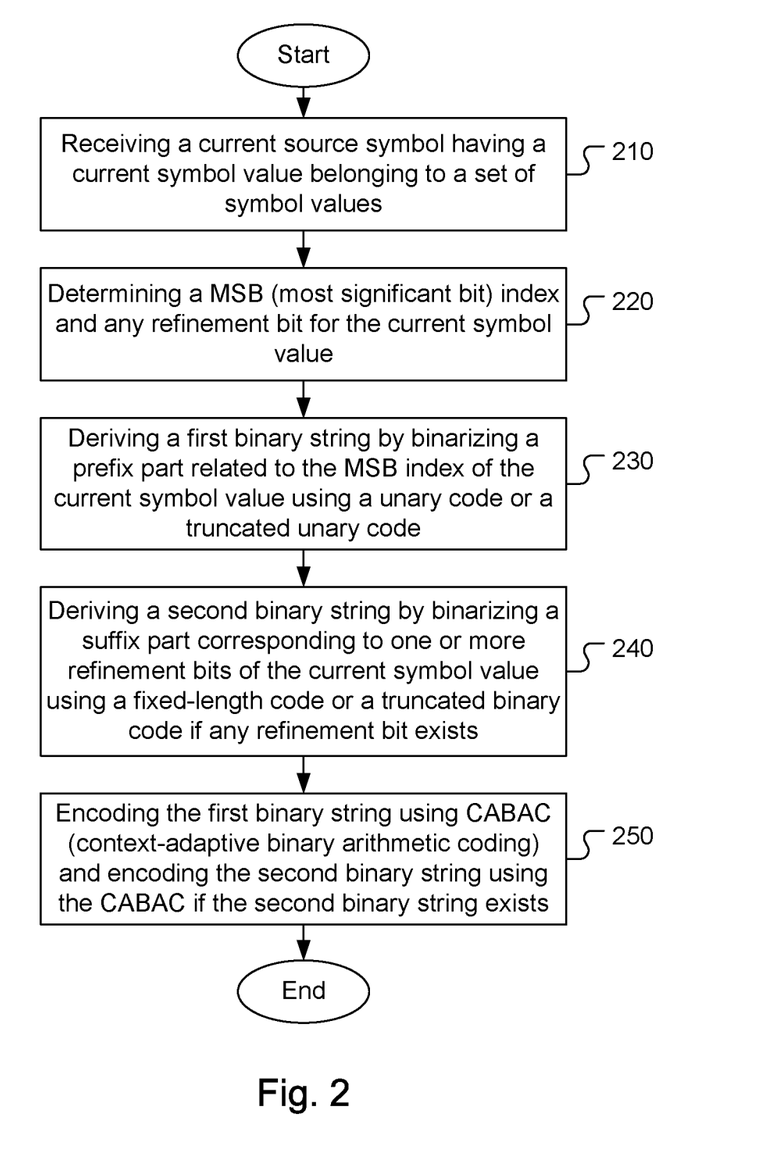
FIG. 2 illustrates an exemplary flowchart of an entropy encoding system for source symbols according to an embodiment of the present invention, where the source symbol is represented in a prefix part and a suffix part and the binary string for the prefix part and the suffix part is coded using CABAC.

FIG. 2 illustrates an exemplary flowchart of an entropy encoding system for source symbols according to an embodiment of the present invention, where the source symbol is represented in a prefix part and a suffix part and the binary string for the prefix part and the suffix part is coded using CABAC. The system receives a current source symbol having a current symbol value belonging to a set of symbol values as shown in step 210. The input data corresponds to pixel data or color indices of the current block to be coded. The input data may be retrieved from memory (e.g., computer memory, buffer (RAM or DRAM) or other media) or from a processor. A MSB (most significant bit) index and any refinement bit for the current symbol value is determined in step 220. A first binary string is derived by binarizing a prefix part related to the MSB index of the current symbol value using a unary code or a truncated unary code in step 230. A second binary string is derived by binarizing a suffix part corresponding to one or more refinement bits of the current symbol value using a fixed-length code or a truncated binary code if any refinement bit exists in step 240. The first binary string is encoded using CABAC (context-adaptive binary arithmetic coding) and the second binary string is also encoded using the CABAC if the second binary string exists in step 250.

Figure 3:
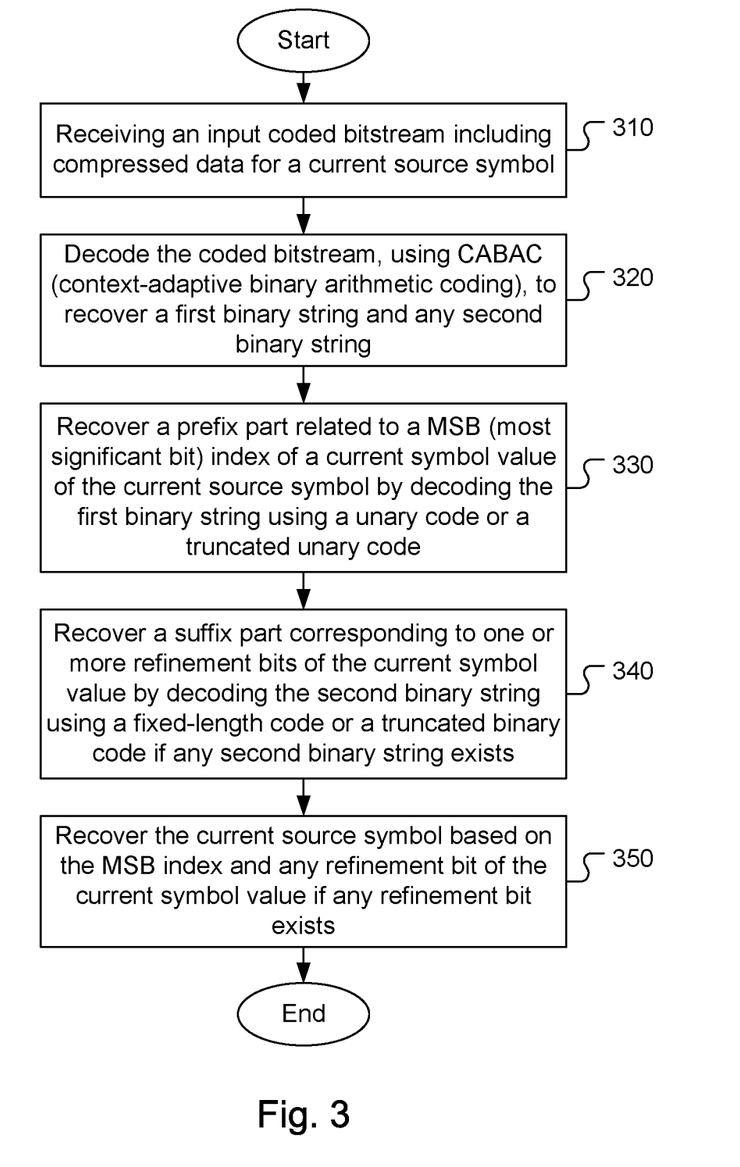
FIG. 3 illustrates an exemplary flowchart of an entropy decoding system for source symbols according to an embodiment of the present invention, where the source symbol is represented in a prefix part and a suffix part and the binary string for the prefix part and the suffix part is coded using CABAC.

FIG. 3 illustrates an exemplary flowchart of an entropy decoding system for source symbols according to an embodiment of the present invention, where the source symbol is represented in a prefix part and a suffix part and the binary string for the prefix part and the suffix part is coded using CABAC. The system receives an input coded bitstream including compressed data for a current source symbol in step 310. The input coded bitstream may be retrieved from memory (e.g., computer memory, buffer (RAM or DRAM) or other media) or from a processor. The coded bitstream is decoded using CABAC (context-adaptive binary arithmetic coding) to recover a first binary string and any second binary string in step 320. A prefix part related to a MSB (most significant bit) index of a current symbol value of the current source symbol is recovered by decoding the first binary string using a unary code or a truncated unary code in step 330. A suffix part corresponding to one or more refinement bits of the current symbol value is recovered by decoding the second binary string using a fixed-length code or a truncated binary code if any second binary string exists in step 340. The current source symbol is recovered based on the MSB index and any refinement bit of the current symbol value if any refinement bit exists in step 350.

The flowcharts shown are intended to illustrate examples of entropy coding using a prefix part and a suffix part according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more electronic circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of palette index map encoding, the method comprising:
    receiving a palette index map for a current block;
    determining a run value that represents a number of consecutive pixels having a same palette index as a current palette index in a scanning order through the current block;
    converting a coded value that corresponds to the run value minus one to a bin string using a binarization method;
    selecting one of candidate modeling contexts according to the current palette index as a selected modeling context; and encoding at least one bin of the bin string using context-adaptive binary arithmetic coding (CABAC) according to the selected modeling context.

2. A method of palette index map decoding, the method comprising:
receiving an input coded bitstream including compressed data of a current block for a current source symbol corresponding to an index mode;
determining a current palette index associated with a current run mode for a number of consecutive pixels having a same palette index as the current palette index in a scanning order through the current block;
selecting one of candidate modeling contexts according to the current palette index as a selected modeling context;
decoding at least one bin of a bin string using context-adaptive binary arithmetic coding (CABAC) according to the selected modeling context;
converting the bin string into a coded value using a binarization method, and determining a run value that represents the number of consecutive pixels according to the coded value, the coded value corresponding to the run value minus one; and
reconstructing the number of consecutive pixels according to the run value using the current palette index.

3. The method of claim 2, wherein the determining the current palette index comprises parsing the input coded bitstream to obtain the current palette index.

4. The method of claim 2, wherein the determining the current palette index comprises deriving the current palette index from a previously reconstructed palette index.

5. The method of claim 1, wherein
the candidate modeling contexts include a first candidate modeling context and a second candidate modeling context, and
the selecting the one of the candidate modeling contexts comprises:
selecting the first candidate modeling context as the selected modeling context in response to the current palette index being less than a threshold; and
selecting the second candidate modeling context as the selected modeling context in response to the current palette index being equal to or greater than the threshold.

6. The method of claim 1, wherein
the candidate modeling contexts include a first candidate modeling context, a second candidate modeling context, and a third candidate modeling context, and
the selecting the one of the candidate modeling contexts comprises:
selecting the first candidate modeling context as the selected modeling context in response to the current palette index being less than a first threshold;
selecting the second candidate modeling context as the selected modeling context in response to the current palette index being equal to or greater than the first threshold and being less than a second threshold; and
selecting the third candidate modeling context as the selected modeling context in response to the current palette index being equal to or greater than the second threshold.

7. The method of claim 2, wherein
the candidate modeling contexts include a first candidate modeling context and a second candidate modeling context, and
the selecting the one of the candidate modeling contexts comprises:
selecting the first candidate modeling context as the selected modeling context in response to the current palette index being less than a threshold; and
selecting the second candidate modeling context as the selected modeling context in response to the current palette index being equal to or greater than the threshold.

8. The method of claim 2, wherein
the candidate modeling contexts include a first candidate modeling context, a second candidate modeling context, and a third candidate modeling context, and
the selecting the one of the candidate modeling contexts comprises:
selecting the first candidate modeling context as the selected modeling context in response to the current palette index being less than a first threshold;
selecting the second candidate modeling context as the selected modeling context in response to the current palette index being equal to or greater than the first threshold and being less than a second threshold; and
selecting the third candidate modeling context as the selected modeling context in response to the current palette index being equal to or greater than the second threshold.

9. The method of claim 1, wherein the selected modeling context is selected further according to a bin index of the at least one bin of the bin string.

10. The method of claim 2, wherein the selected modeling context is selected further according to a bin index of the at least one bin of the bin string.

* * * * *